United States Patent
Caraccio et al.

(10) Patent No.: US 12,444,476 B2
(45) Date of Patent: Oct. 14, 2025

(54) HOST CONTROLLED MEDIA TESTING OF MEMORY

(71) Applicant: Micron Technology, Inc., Boise, ID (US)

(72) Inventors: Danilo Caraccio, Milan (IT); Daniele Balluchi, Cernusco sul Naviglio (IT); Niccolò Izzo, Vignate (IT); Alessandro Orlando, Milan (IT)

(73) Assignee: Micron Technology, Inc., Boise, ID (US)

( * ) Notice: Subject to any disclaimer, the term of this patent is extended or adjusted under 35 U.S.C. 154(b) by 166 days.

(21) Appl. No.: 18/120,086

(22) Filed: Mar. 10, 2023

(65) Prior Publication Data
US 2023/0290427 A1 Sep. 14, 2023

Related U.S. Application Data

(60) Provisional application No. 63/319,622, filed on Mar. 14, 2022.

(51) Int. Cl.
*G11C 29/56* (2006.01)
*G06F 21/44* (2013.01)

(52) U.S. Cl.
CPC ...... *G11C 29/56016* (2013.01); *G06F 21/445* (2013.01)

(58) Field of Classification Search
CPC .. G11C 29/56016; G11C 29/10; G06F 21/445
USPC ........................................................ 714/718
See application file for complete search history.

(56) References Cited

U.S. PATENT DOCUMENTS

| | | | |
|---|---|---|---|
| 9,557,366 B2 | 1/2017 | Lee | |
| 2007/0005952 A1 | 1/2007 | Ho | |
| 2009/0198484 A1* | 8/2009 | Christensen | G06F 11/3668 703/22 |
| 2012/0153982 A1* | 6/2012 | Lee | G01R 31/31908 324/756.07 |
| 2019/0114103 A1* | 4/2019 | Shlick | G06F 3/0679 |
| 2021/0109845 A1* | 4/2021 | Shah | G06F 11/3698 |
| 2021/0390179 A1* | 12/2021 | Hahn | G06F 21/602 |
| 2022/0083221 A1* | 3/2022 | Agarwal | G06F 3/0619 |

(Continued)

OTHER PUBLICATIONS

Sharma, DR. Debendra Das, "Compute Express Link 2.0 White Paper", CXL Compute Express Link, https://b373eaf2-67af-4a29-b28c-3aae9e644f30.filesusr.com/ugd/0c1418_14c5283e7f3e40f9b2955c7d0f60bebe.pdf, retrieved from the Internet on Dec. 8, 2021, 4 pages.

(Continued)

*Primary Examiner* — Albert Decady
*Assistant Examiner* — Osman M Alshack
(74) *Attorney, Agent, or Firm* — Brooks, Cameron & Huebsch, PLLC (57) ABSTRACT

A controller can be configured to enable a host to control media testing on a memory device. The interface between the host and the memory can be abstract, such that the host does not have direct control over the memory. Instead, the controller can provide translation between a host protocol, such as compute express link (CXL), and a memory protocol, such as a protocol to control a dual data rate (DDR) interface. The controller can enable media test capability discovery, configuration, and/or control for the host. The controller can enable media test result reporting from the memory to the host.

12 Claims, 4 Drawing Sheets

(56) References Cited

U.S. PATENT DOCUMENTS

2022/0406368 A1* 12/2022 Jung .................. G11C 11/4085
2023/0163964 A1*  5/2023 Erickson ............... H04L 9/0877
                                                            713/189
2023/0205562 A1*  6/2023 Basak ................. G06F 13/4221
                                                              718/1

OTHER PUBLICATIONS

Koyle, et al., "Micron DDR5: Key Module Features", DDR4 vs. DDR5 DIMM, Micron Technical Brief, Jul. 2020, 7 pages.

* cited by examiner

HOST CONTROLLED MEDIA TESTING OF MEMORY

CROSS-REFERENCE TO RELATED APPLICATIONS

This application claims priority to U.S. Provisional Application No. 63/319,622, filed Mar. 14, 2022, which is incorporated herein by reference.

TECHNICAL FIELD

The present disclosure relates generally to semiconductor memory and methods, and more particularly, to apparatuses, systems, and methods for host controlled media testing of memory.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Systems, apparatuses, and methods related to host controlled media testing of memory are described. In some previous approaches, memory media testing can be performed during system manufacturing or during the time after a computing system is powered on but before the operating system (OS) boots up. For example, a host having direct access to system memory (e.g., DRAM) could use a basic input/output system (BIOS) or other firmware to perform media tests of the system memory, such as a power on self test (POST). As another example, a central processing unit (CPU) having direct access to the memory can cause the memory to be tested. However, some emerging memory systems are not so closely coupled to the host to allow for such control. For example, different memory types may be connected to the host via an abstracted interface that does not provide for direct host control over the memory. A desire exists to provide the ability for the host to test such memory systems.

Aspects of the present disclosure address the above and other challenges. For example, a controller can be configured to enable a host to control media testing on a memory device. The interface between the host and the memory can be abstract, such that the host does not have direct control over the memory. Instead, the controller can provide translation between a host protocol, such as compute express link (CXL), and a memory protocol, such as a protocol to control a dual data rate (DDR) memory interface. The controller can enable media test capability discovery, configuration, and/or control for the host. The controller can enable media test result reporting from the memory to the host.

Such media tests could help determine signal integrity on buses of the memory devices, bit error rates (BER), or other potential issues that could warrant replacement of the memory device without interrupting the overall system making use of the memory device. One example of a media test is a marching test, which can be used to detect data retention faults (e.g., bit flips), address faults (e.g., a defect in an address decoder), and neighborhood pattern sensitive faults (e.g., errors caused by the close physical proximity of memory components, such as charge sharing), among others. A marching test includes a finite sequence of march elements (read and/or write operations applied to memory cells in increasing or decreasing address order). One example of a marching test is a MATS+marching test.

CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 112 may reference element "12" in FIG. 1, and a similar element may be referenced as 212 in FIG. 2. Analogous elements within a Figure may be referenced with a hyphen and extra numeral or letter. See, for example, elements 116-1, . . . , 116-N in FIG. 1. Such analogous elements may be generally referenced without the hyphen and extra numeral or letter. For example, elements 116-1, . . . , 116-N may be collectively referenced as 116. As used herein, the designators "M", "N", and "P", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
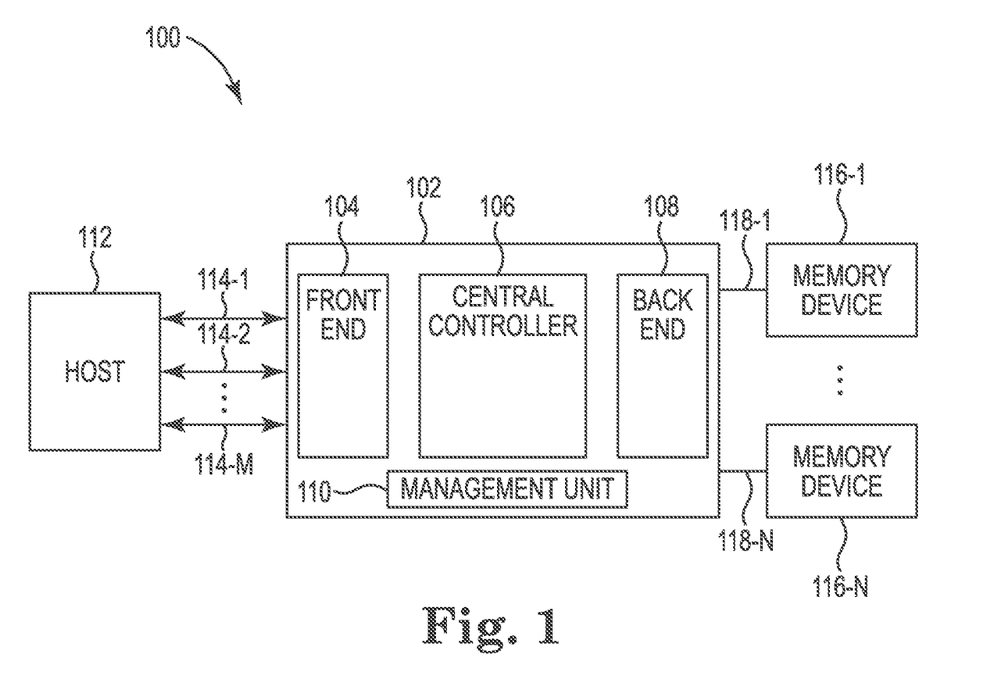
FIG. 1 is a block diagram of a computing system in accordance with a number of embodiments of the present disclosure.

FIG. 1 is a block diagram of a computing system 100 in accordance with a number of embodiments of the present disclosure. The computing system 100 can include a memory controller 102 having a front end portion 104, a central controller portion 106, a back end portion 108, and a management unit 110. The computing system 100 can include a host 112 and memory devices 116-1, . . . ,116-N coupled to the memory controller 102.

The front end portion 104 includes a host interface and interface management circuitry to couple the memory controller 102 to the host 112 through the input/output (I/O) lanes 114-1, 114-2, . . . , 114-M and circuitry to manage the I/O lanes 114. There can be any quantity of I/O lanes 114, such as eight, sixteen, or another quantity of I/O lanes 114. In some embodiments, the I/O lanes 114 can be configured as a single port. In at least one embodiment, the interface between the memory controller 102 and the host 112 can be a PCIe physical and electrical interface operated according to a CXL protocol.

The central controller portion 106 can include and/or be referred to as data management circuitry. The central controller portion 106 can control, in response to receiving a request from the host 112, performance of a memory operation. Examples of the memory operation include a read operation to read data from a memory device 116 or a write operation to write data to a memory device 116. An example of the memory devices 116 is DRAM operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). The memory devices 116 each include at least one array of memory cells. In addition to data, the memory devices 116 can store identifiers of media tests and/or media test lists that the memory device 116 supports (is capable of performing). A media test list is a list of one or more media tests that are intended to be executed as part of one testing process. As used herein "media" refers to portions of the data path for the memory devices 116, such as the memory cells, buses, etc.

The central controller portion 106 can generate error detection information and/or error correction information based on data received from the host 112. The central controller portion 106 can perform error detection operations and/or error correction operations on data received from the host 112 or from the memory devices 116. An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data. An example of an error correction operation is an error correction code (ECC) operation. ECC encoding refers to encoding data by adding redundant bits to the data. ECC decoding refers to examining the ECC encoded data to check for any errors in the data. In general, the ECC can not only detect the error but also can correct a subset of the errors it is able to detect.

The back end portion 108 can include a media controller and a physical (PHY) layer that couples the memory controller 102 to the memory devices 116. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 118-1, . . . , 118-N. The back end portion 108 incudes a memory interface coupled to the channels 118 to exchange (e.g., transmit or receive) data, commands, instructions, etc. with the memory devices 116.

In some embodiments, the memory controller 102 can include a management unit 110 to initialize, configure, and/or monitor characteristics of the memory controller 102. The management unit 110 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 102. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

In some embodiments, the memory controller 102 can translate communications between the host 112 and the memory devices 116. For example, the controller 102 can translate communications received via the host interface from a first protocol to a second protocol and translate communications received from the memory interface from the second protocol to the first protocol. In some embodiments, the controller 102 can use CXL protocols to manage the host interface, which may be configured electrically and physically as a PCIe interface.

The controller 102 can receive signals indicative of media test capability information via the memory interface and transmit signals indicative of the media test capability information via the host interface. The media test information can include a respective identifier (e.g., a universally unique identifier (UUID)) for each media test that a memory device 116 coupled to the memory interface is capable of performing. The controller 102 can thereby advantageously allow the host 112 to learn what media tests the memory devices 116 are capable of performing. The media test capability information can include definitions of supported media test modes and/or media test properties, which are described in more detail with respect to FIG. 3.

The controller 102 can receive signals indicative of a request for a description of a particular media test via the host interface and transmit signals indicative of the request via the memory interface. The controller 102 can receive signals indicative of the description of the particular test via the memory interface and transmit signals indicative of the description via the host interface. The controller 102 can advantageously allow the host 112 to learn more information about particular tests from the memory device 116, such as properties of the test (e.g., a description of a testing algorithm, an execution time for the test, any flags associated with the test, test data patterns supported by the test, etc.).

The controller 102 can receive signals indicative of media test configuration information via the host interface and transmit signals indicative of the media test configuration information via the memory interface. The controller 102 can receive signals indicative of media test execution instructions via the host interface and transmit signals indicative of the media test execution instructions via the memory interface. The media test execution instructions can be for a single media test or for a media test list. In some embodiments, the controller 102 can transmit signals indicative of a test data pattern in response to the media test execution instructions being of a type that requires a test data pattern for the memory device 116 to execute the media test. The controller 102 can distinguish between media test execution instructions for an entire memory device 116 versus an address range of a memory device 116 and translate and transmit the instructions accordingly. The controller 102 can advantageously allow the host 112 to control media testing by the memory devices 116 although the host 112 does not have direct control over the memory devices 116 as it would in some previous approaches including system memory, such as DRAM on a host system (e.g., motherboard).

The controller 102 can receive signals indicative of media test result information via the host interface and transmit signals indicative of the media test result information via the host interface. The controller 102 can thereby allow for results reporting from the memory device 116 to the host 112. The controller 102 can receive signals indicative of media test abort instructions via the host interface and transmit signals indicative of the media test abort instructions via the memory interface. The controller 102 can thereby provide the host 112 with the ability to stop the media test before it is completed by the memory device 116. The controller 102 can establish mutual authentication between the host 112 and the memory device 116 as described in more detail with respect to FIG. 4.

Figure 2:
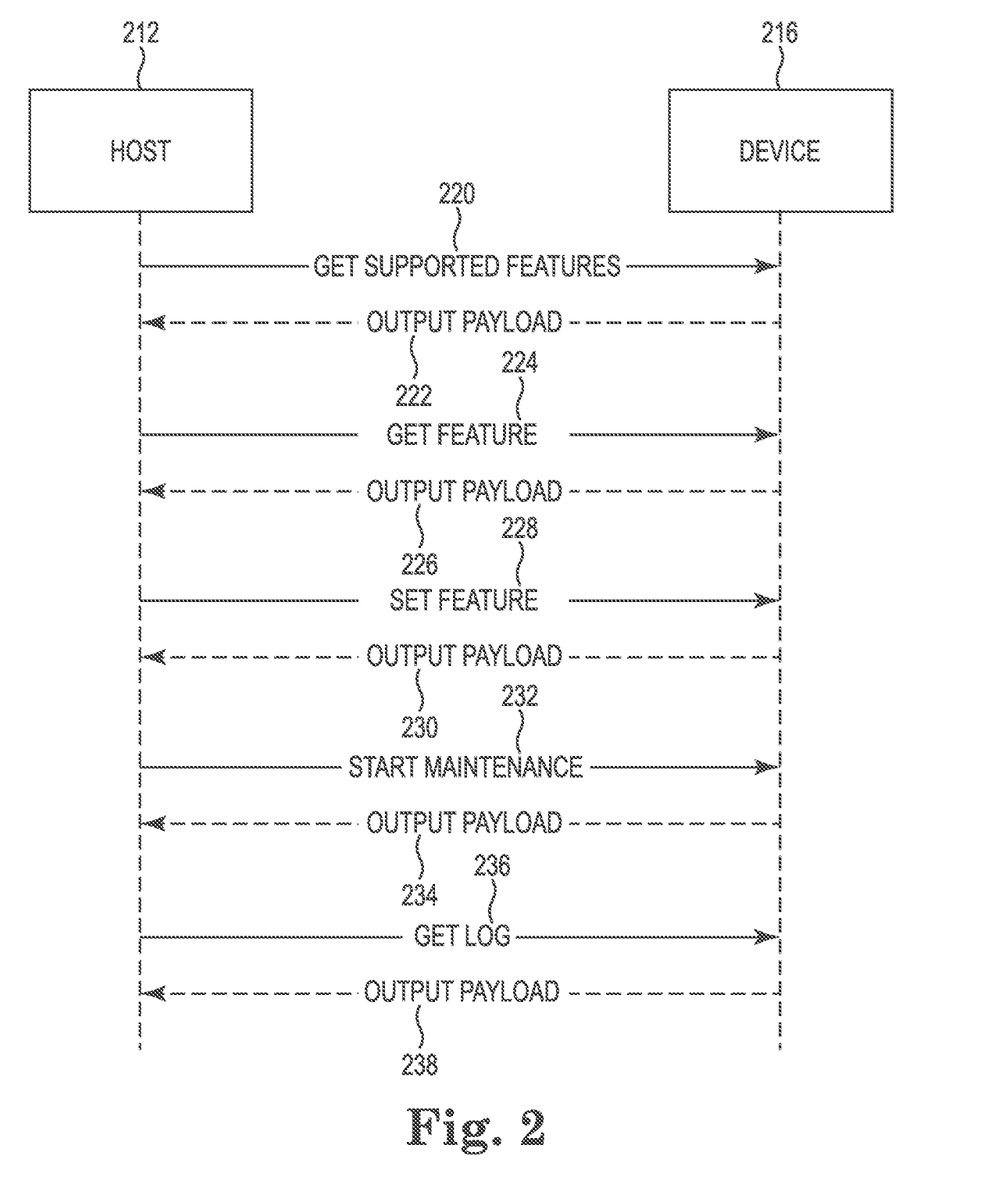
FIG. 2 is a signaling diagram between a host and a memory device for host controlled media testing of memory in accordance with a number of embodiments of the present disclosure.

FIG. 2 is a signaling diagram between a host 212 and a memory device 216 for host controlled media testing of memory in accordance with a number of embodiments of the present disclosure. Although not specifically illustrated in FIG. 2, the signals between the host 212 and the memory device 216 pass through and can be translated or otherwise modified by a controller (e.g., the controller 102 illustrated in FIG. 1). In addition to any translation, the controller can make other physical and/or protocol changes to the signaling necessary to communicate between the host and the memory, such as accounting for different physical interfaces (e.g., pins), voltages, currents, timing, etc. The signaling diagram can represent a method for host controlled media testing of memory, although not every signal illustrated in required to perform the method in each embodiment.

The host 212 can transmit signals indicative of a get supported features command as illustrated at 220. The host 212 can use the get supported features command in order to learn the media testing capabilities of the memory device 216. For example, the host 212 can use the get supported features command when the host 212 is initially coupled to the memory device 216 (via the controller) or when new memory devices are coupled to the controller. The controller can receive the signals indicative of the get suppurated features command and transmit corresponding signals indicative of the get supported features command to the memory device 216. In this context, "corresponding signals" refers to signals that have been appropriately translated, provided in accordance with a desired protocol, etc.

The memory device 216 can store a respective identifier for each media test that it supports. As illustrated at 222 ("output payload"), in response to the get supported features command, the memory device 216 can transmit signals indicative of a identifiers, each identifier corresponding to a respective media test supported by the memory device 216. The controller can transmit corresponding signals indicative of the identifiers to the host 212. The host 212 can be configured with a list of media tests and corresponding identifiers of each media test so that upon receipt of the identifiers from the memory device 216, the host 212 is aware of the media test capabilities of the memory device 216. In at least one embodiment, the identifiers are UUIDs, such that any host 212 and memory device 216 can identify a particular media test with the same UUID. Different hosts and memory devices can use the same UUIDs to identify the same media tests, which allows the hosts and memory devices to exchange UUIDs to identify media test capabilities and desires rather than having to exchange full descriptions of every media test.

While the identifier of the media test may inform the host 212 of the capability of memory device 216 to perform the media test, some media tests may have configurable properties. For some media tests, the configurable properties may vary across different media devices. As illustrated at 224, the host 212 can transmit signals indicative of a get feature command in order to discover properties of a particular media test. The controller can transmit corresponding signals indicative of the get feature command to the memory device 216. The get feature command can include an identification of the particular media test (e.g., the UUID) to which the get feature command pertains.

As illustrated at 226 ("output payload"), the memory device 216 can transmit signals indicative of the properties of the particular media test in response to the get feature command. The controller can transmit corresponding signals indicative of the properties of the particular media test to the host 212. Examples of such media test properties include a description of a testing algorithm, an execution time for the media test per amount of memory (e.g., how long the memory device 216 will take or is allowed to take to execute the media test), a time scale for the media test, a maximum operation latency for the media test, any flags associated with the media test, test data patterns supported by the memory device 216, etc. Examples of flags include indications of whether address ranges are configurable, an indication of whether the media test can be repeated with a complementary test data pattern, an indication of whether the media test can be stopped in response to a discovered error, and an indication of an addressing mode, among others.

As illustrated at 228, the host 212 can transmit signals indicative of a set feature command. The set feature command can include a definition of one or more properties of the media test, a definition of a test mode, a quantity of iterations of the media test to be performed, or other configurations of the media test to be performed. In some embodiments, the set feature command can be a set media test list feature command to configure more than one media test to be executed together (e.g., simultaneously, sequentially, etc.) in response to a single start maintenance command. The controller can transmit corresponding signals indicative of the set feature command to the memory device 216. The controller can thereby configure a particular media test on the memory device 216 in response to the set feature command from the host 212. For example, the controller can configure a duration of the particular media test to be performed corresponding to the definition of the test mode according to the set feature command. As illustrated at 230 ("output payload"), the memory device 216 can transmit signals indicative of a confirmation that the particular feature has been set. The controller can transmit corresponding signals to the host 212.

Examples of test modes include quick test, long test, timed test, factory burn-in test, and vendor-specific test. The set feature command can configure a maximum duration of the media test. In some embodiments, particular maximum durations can be predefined as "quick" or "long" for a particular type of media test. The timed test refers to defining a specific amount of time during which the media test can execute by the set feature command. The factory burn-in test refers to a media test that is intended to be executed before a memory device 216 is operated with user data. The factory burn-in test can be configured to execute with an unconstrained time. The term "factory burn-in" in this context does not mean that the test needs to be performed at the manufacturer's facility or before shipping of the memory device, 216, but indicates a test to be performed in the field to replicate a test that might otherwise have been performed by the manufacturer of the memory device 216. The vendor-specific test refers to a custom configured test specific to desired operating parameters of a particular host (or a vendor of the host).

As illustrated at 232, the host 212 can transmit signals indicative of a start maintenance command. In some embodiments, the signals indicative of the start maintenance command can also be indicative of a test data pattern. The memory device 216 may or may not store test data patterns for use in media testing. The host 212 can either rely on the test data patterns stored in the memory device 216 or provide its own test data pattern for the media test. The controller can transmit corresponding signals to the memory device 216, thereby causing the particular media test (or media test list) to be run on the media of the memory device 216 in response to the start maintenance command from the host 212. As illustrated at 234 ("output payload"), the memory device 216 can transmit signals indicative of a confirmation that the start maintenance command has been received and/or that execution of the media test has begun or will begin. The controller can transmit corresponding signals to the host 212.

Although not specifically illustrated, the host 212 can transmit signals indicative of an abort media test command. The controller can transmit corresponding signals to the memory device 216, thereby causing the particular media test to be aborted. The memory device 216 can transmit signals indicative of a confirmation that the abort media test command has been received and/or that execution of the media test has stopped or will stop. If the media test has already been completed or cannot be aborted for any reason, the memory device 216 can transmit signals indicative of that fact. The controller can transmit corresponding signals to the host 212 indicating that the media test has been aborted, will be aborted, or cannot be aborted.

As illustrated at 236, the host 212 can transmit signals indicative of a get log command. The controller can transmit corresponding signals to the memory device 216. As illustrated at 238 ("output payload"), the memory device 216 can transmit signals indicative of the results of the media test in response to the get log command from the host 212. The controller can transmit corresponding signals to the host 212. Although not specifically illustrated in FIG. 2, the controller can facilitate mutual authentication between the host 212 and the memory device 216.

Figure 3:
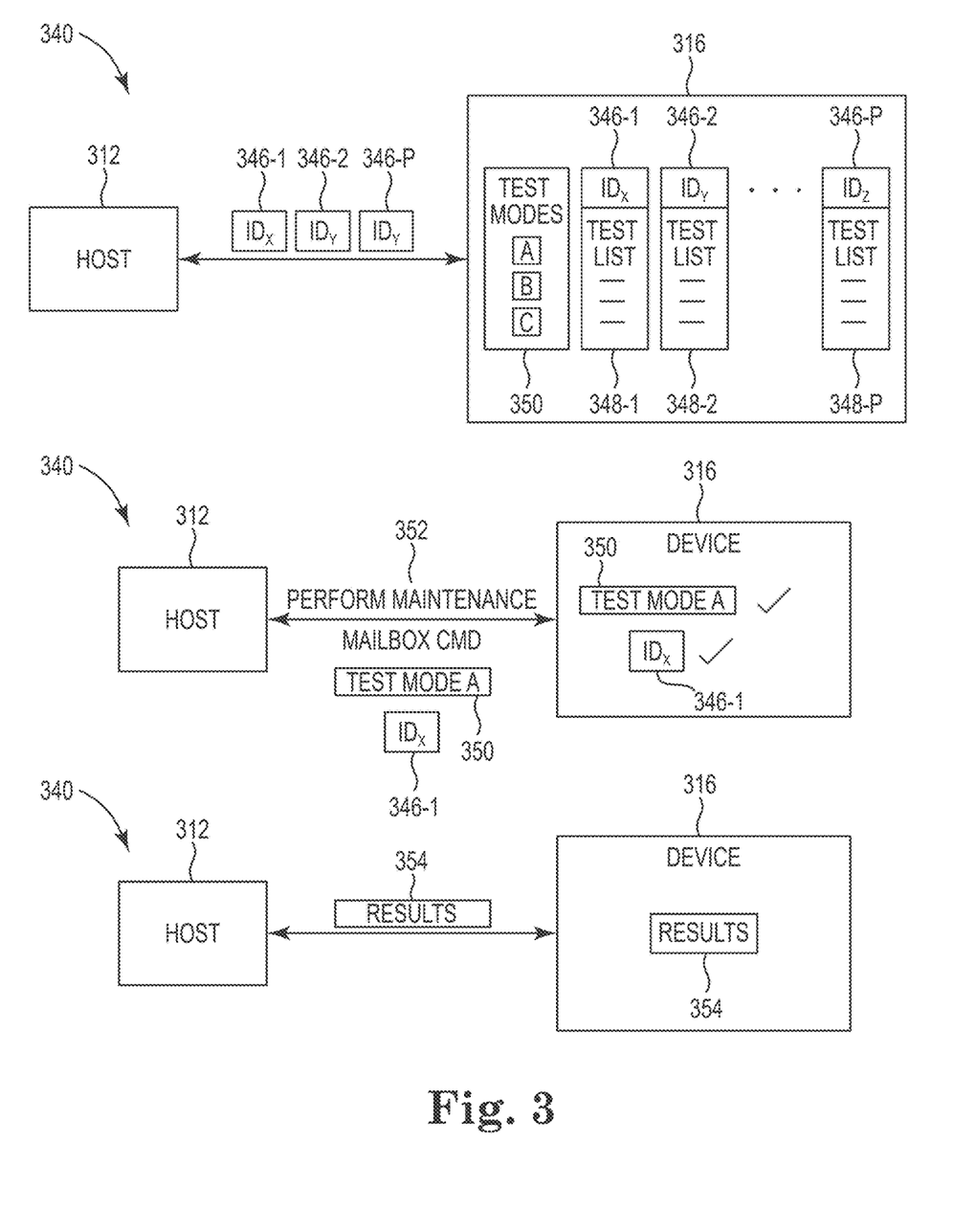
FIG. 3 is a block diagram illustrating a method for host controlled media testing of memory in accordance with a number of embodiments of the present disclosure.

FIG. 3 is a block diagram illustrating a method for host controlled media testing of memory in accordance with a number of embodiments of the present disclosure. Although not specifically illustrated in FIG. 3, the communications between the host 312 and the memory device 316 pass through and can be translated or otherwise modified by a controller (e.g., the controller 102 illustrated in FIG. 1). In addition to any translation, the controller can make other physical and/or protocol changes to the signaling necessary to communicate between the host and the memory, such as accounting for different physical interfaces (e.g., pins), voltages, currents, timing, etc.

As illustrated at 340, the memory device 316 can store identifiers 346-1, 346-2, . . . , 346-P (indicated as IDx, IDy, IDz) and respective media tests lists 348-1, 348-2, . . . , 348-P corresponding to each of the identifiers 346. In the example illustrated in FIG. 3, the identifiers 346 identify media tests lists rather than individual media tests, which may still have their own identifier. Each media test list 348 includes a quantity of media tests, each of which is supported by the memory device 316. A particular media test can be included in more than one media test list 348. The memory device 316 can transmit signals indicative of the identifiers 346 to the host 312 via the controller (e.g., in response to a get supported features command). The memory device 316 can store information indicating various test modes 350 (indicated as A, B, C in FIG. 3). As described herein, examples of test modes include quick test, long test, timed test, factory burn-in test, and vendor-specific test.

As illustrated at 342, the memory device 316 can receive signals indicative of a CXL perform maintenance mailbox command 352 from the host 312 (via the controller) that includes one of the identifiers 346-1. Mailbox commands are register-based commands defined in the CXL standard. In some embodiments, the CXL perform maintenance mailbox command 352 can be accompanied by a definition of a test mode 350 (indicated as Test Mode A in FIG. 3). In response to receiving the definition of the test mode 350, the test mode 350 can be configured prior to running the media tests of the media test list 348-1 associated with the indicator 346-1 of the media test list 348-1, as indicated by the checkmarks in the memory device 316. Configuring the test mode for a media test list is largely analogous to configuring the test mode for a single media test as described herein, except that the various timing properties can be defined for the duration of the entire test list instead of the individual media test. For example, a maximum duration of the execution of the test list can be configured. The memory device 316 can run the media tests from the media test list 348-1 corresponding to the identifier 346-1.

As illustrated at 344, after running the media tests, the memory device 316 can store results 354 of the media tests.

The memory device 316 can transmit signals indicative of the results 354 to the host 312 (via the controller).

Figure 4:
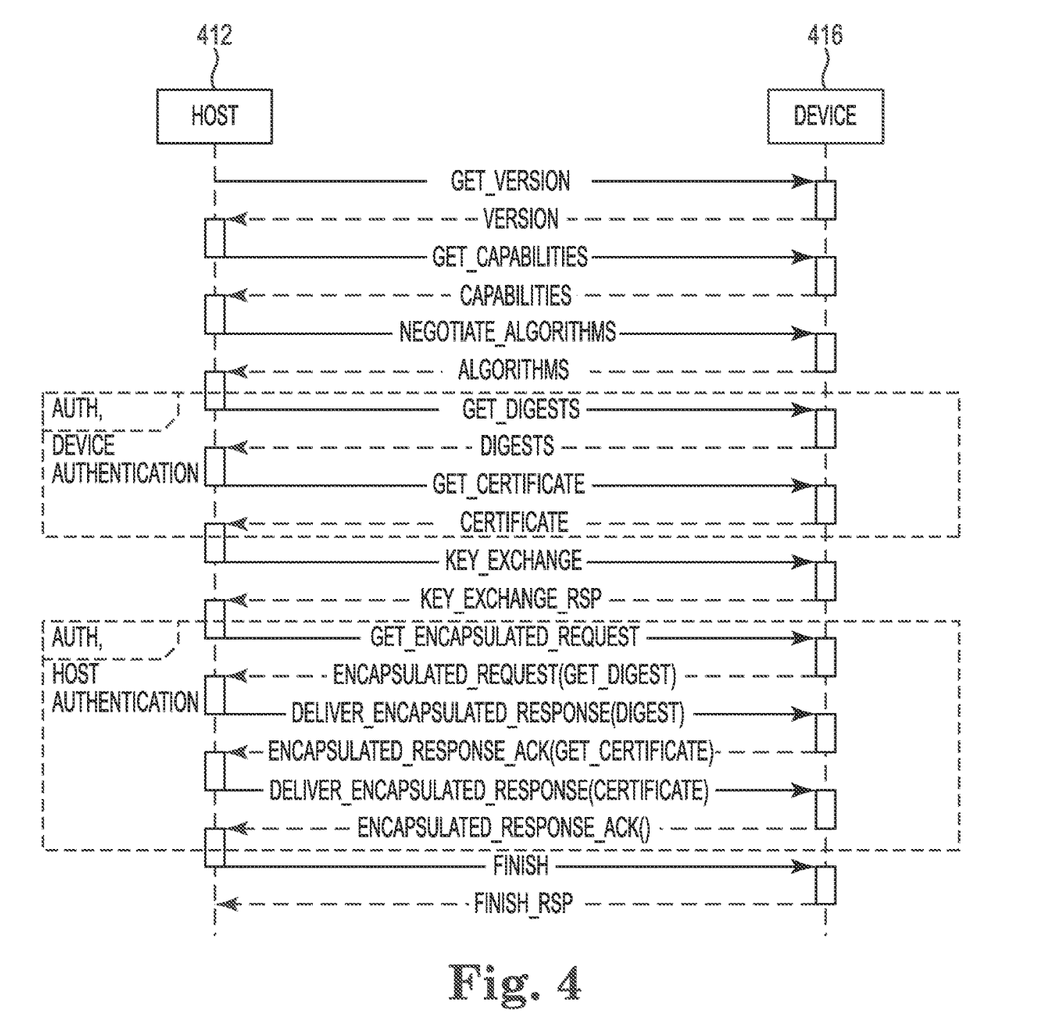
FIG. 4 is a signaling diagram between a host and a memory device for mutual authentication between the host and the memory in accordance with a number of embodiments of the present disclosure.

FIG. 4 is a signaling diagram between a host and a memory device for mutual authentication between the host 412 and the memory device 416 in accordance with a number of embodiments of the present disclosure. In some embodiments, a mutual authentication process between the host 412 and memory device 416 (such as that illustrated in FIG. 4) can be performed prior to the host controlling media testing on the memory device 416 as described herein. Although not specifically illustrated in FIG. 4, the communications between the host 412 and the memory device 416 pass through and can be translated or otherwise modified by a controller (e.g., the controller 102 illustrated in FIG. 1). In addition to any translation, the controller can make other physical and/or protocol changes to the signaling necessary to communicate between the host and the memory, such as accounting for different physical interfaces (e.g., pins), voltages, currents, timing, etc. The controller can be configured to establish a security protocol and data model (SPDM) session for mutual authentication between the host 412 coupled to the host interface and the memory device 416 coupled to the memory interface to enable the host to issue media test execution instructions to the memory device via the controller.

The host 412 can transmit signals indicative of a get version command to learn which version of a security protocol the memory device 416 is capable of supporting. In response, the memory device 416 can transmit signals indicative of the supported version.

The host 412 can transmit signals indicative of a get capabilities command to learn which specific capabilities the memory device 416 has within the defined version. In response, the memory device 416 can transmit signals indicative of its security capabilities.

The host 412 can transmit signals indicative of negotiating which security algorithms will be used by the memory device 416. In response, the memory device 416 can transmit signals indicative of the security algorithms to be used.

The memory device 416 can be authenticated via an exchange of digests and certificates. The host 412 can transmit signals indicative of a get digests command to learn which digests are used by the memory device 416. In response, the memory device 416 can transmit signals indicative of the digests to be used. The host 412 can transmit signals indicative of a get certificate command to learn which security certificate the memory device 416 possesses. In response, the memory device 416 can transmit signals indicative of its security certificate.

The host 412 can transmit signals indicative of a key exchange request for the memory device 416. In response, the memory device 416 can transmit signals indicative of its security key to be used.

The host 412 can be authenticated via an exchange of encapsulated digests and certificates. The host 412 can transmit signals indicative of a request for encapsulated communication. In response, the memory device 416 can transmit signals indicative of an encapsulated get digest command. In response, the host 412 can transmit signals indicative of an encapsulated digest to be used for the host authentication. The memory device 416 can transmit signals indicative of an encapsulated get certificate command to learn which security certificate the host 412 possesses. In response, the host can transmit signals indicative of an encapsulated security certificate used by the host 412. In response, the memory device 416 can transmit signals indicative of an encapsulated response acknowledging the host authentication.

The host 412 can transmit signals indicative of a completing of the mutual authentication process with the memory device 416. In response, the memory device 416 can transmit signals indicative of an acknowledgement that the mutual authentication is complete. After a successful mutual authentication, the host 412 can issue media test commands to the memory device 416 (via the controller) for execution.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   storing a plurality of identifiers and respective media test lists corresponding to each of the plurality of identifiers, wherein the respective media test lists each include a respective plurality of media tests supported by a memory device;
   receiving a compute express link (CXL) perform maintenance mailbox command from the host that includes one of the plurality of identifiers and a definition of a test mode; and
   configuring the test mode and running a plurality of media tests from the respective media test list corresponding to the one of the plurality of identifiers;
   wherein configuring the test mode further comprises configuring an unconstrained test time for the plurality of media tests in response to the definition of the test mode comprising a factory burn-in test.

2. The method of claim 1, further comprising transmitting signals indicative of the plurality of identifiers from a memory controller to the host prior to receiving the CXL perform maintenance mailbox command.

3. The method of claim 2, further comprising transmitting signals indicative of results of the plurality of media tests from the memory controller to the host.

4. The method of claim 1, wherein configuring the test mode further comprises configuring a respective maximum duration of the plurality of media tests in response to the definition of the test mode comprising a quick test or a long test.

5. The method of claim 1, wherein configuring the test mode further comprises configuring a specific duration for the plurality of media tests in response to the definition of the test mode comprising a timed test.

6. The method of claim 1, wherein configuring the test mode further comprises custom configuring the plurality of media tests in response to the definition of the test mode comprising a vendor-specific test.

7. An apparatus, comprising:
  a host interface;
  a memory interface; and
  a controller coupled to the host interface and to the memory interface, wherein the controller is configured to:
    store a plurality of identifiers and respective media test lists corresponding to each of the plurality of identifiers, wherein the respective media test lists each include a respective plurality of media tests supported by a memory device coupled to the memory interface;
    receive a compute express link (CXL) perform maintenance mailbox command from the host interface that includes one of the plurality of identifiers and a definition of a test mode;
    configure the test mode and run a plurality of media tests from the respective media test list corresponding to the one of the plurality of identifiers; and
    configure an unconstrained test time for the plurality of media tests in response to the definition of the test mode comprising a factory burn-in test.

8. The apparatus of claim 7, wherein the controller is further configured to transmit signals indicative of the plurality of identifiers to the host interface prior to receiving the CXL perform maintenance mailbox command.

9. The apparatus of claim 8, wherein the controller is further configured to transmit signals indicative of results of the plurality of media tests to the host interface.

10. The apparatus of claim 7, wherein the controller is further configured to configure a respective maximum duration of the plurality of media tests in response to the definition of the test mode comprising a quick test or a long test.

11. The apparatus of claim 7, wherein the controller is further configured to configure a specific duration for the plurality of media tests in response to the definition of the test mode comprising a timed test.

12. The apparatus of claim 7, wherein the controller is further configured to custom configure the plurality of media tests in response to the definition of the test mode comprising a vendor-specific test.

\* \* \* \* \*